United States Patent
Wu

(10) Patent No.: US 12,292,599 B2
(45) Date of Patent: May 6, 2025

(54) OPTICAL DELAY LINE STRUCTURE

(71) Applicant: EZCONN CORPORATION, New Taipei (TW)

(72) Inventor: Chin-Tsung Wu, New Taipei (TW)

(73) Assignee: EZCONN CORPORATION, New Taipei (TW)

( * ) Notice: Subject to any disclaimer, the term of this patent is extended or adjusted under 35 U.S.C. 154(b) by 517 days.

(21) Appl. No.: 17/563,180

(22) Filed: Dec. 28, 2021

(65) Prior Publication Data
US 2022/0206225 A1   Jun. 30, 2022

Related U.S. Application Data

(60) Provisional application No. 63/131,828, filed on Dec. 30, 2020.

(51) Int. Cl.
*G02B 6/28* (2006.01)
*G02B 7/182* (2021.01)

(52) U.S. Cl.
CPC ........... *G02B 6/2861* (2013.01); *G02B 7/182* (2013.01)

(58) Field of Classification Search
CPC ...... G02B 6/2861; G02B 7/182; G02B 26/06; G02B 26/8016; G02B 27/198; G02B 27/30
See application file for complete search history.

(56) References Cited

U.S. PATENT DOCUMENTS

| | | | | |
|---|---|---|---|---|
| 2,623,436 A * | 12/1952 | Olson | ............ | G02B 7/182 248/475.1 |
| 3,915,575 A * | 10/1975 | Sick | ............ | G01N 21/534 356/138 |
| 4,167,328 A * | 9/1979 | Cross | ............ | G01S 7/497 356/4.02 |
| 6,290,363 B1 * | 9/2001 | Masutani | ............ | G02B 5/12 359/199.1 |

(Continued)

FOREIGN PATENT DOCUMENTS

| CN | 101706597 A | * 5/2010 |
|---|---|---|
| CN | 203337857 U | * 12/2013 |

(Continued)

OTHER PUBLICATIONS

KR 102043279 B1 (English Translation) (Year: 2019).*
(Continued)

*Primary Examiner* — Marin Pichler
*Assistant Examiner* — Mary A El-Shammaa
(74) *Attorney, Agent, or Firm* — Min-Lee Teng

(57) ABSTRACT

The present invention discloses an optical delay line structure, including an outer housing, an inner housing and a reflection assembly. The outer housing is connected to the inner housing and an optical fiber. The reflection assembly is placed on the inner housing. The inner housing can move axially on an outer housing thread part of the outer housing so as to change the light path between the optical fiber and the reflection component. The reflection assembly includes a mirror holder, a reflection mirror, a plurality of fixing screws and a plurality of adjusting screws. When at least one of the adjusting screws is moved, the reflection mirror will tilt at different angles, thereby changing the path and intensity of light wave.

19 Claims, 5 Drawing Sheets

(56) References Cited

U.S. PATENT DOCUMENTS

| | | | | |
|---|---|---|---|---|
| 2013/0201572 A1* | 8/2013 | Yachi | ...................... | G02B 7/182 |
| | | | | 359/872 |
| 2014/0217270 A1* | 8/2014 | Tomita | ................. | G02B 6/4214 |
| | | | | 250/227.28 |
| 2018/0203249 A1* | 7/2018 | Filhaber | ............... | G02B 26/105 |
| 2018/0348435 A1* | 12/2018 | Yao | .......................... | G02B 6/34 |
| 2021/0113121 A1* | 4/2021 | Diab | .................... | A61B 5/0073 |

FOREIGN PATENT DOCUMENTS

| | | | | | |
|---|---|---|---|---|---|
| CN | 106383397 | A | * | 2/2017 | ........... G02B 7/1824 |
| CN | 106419839 | A | * | 2/2017 | ........... A61B 5/0095 |
| CN | 109477968 | A | * | 3/2019 | ............. B60K 35/00 |
| CN | 209044186 | U | * | 6/2019 | ............. G01K 11/32 |
| CN | 110088993 | A | * | 8/2019 | ................ G02F 1/37 |
| CN | 110376700 | A | * | 10/2019 | ............... G02B 7/00 |
| CN | 210982908 | U | * | 7/2020 | |
| DE | 102014109681 | A1 | * | 1/2016 | ............. G02B 5/122 |
| DE | 102018106012 | B3 | * | 3/2019 | ............. G02B 7/182 |
| GB | 2560494 | A | * | 9/2018 | ........... G02B 26/023 |
| JP | H0829579 | A | * | 2/1996 | .............. Y02E 30/30 |
| JP | 2011247601 | A | * | 12/2011 | |
| KR | 102043279 | B1 | * | 11/2019 | ......... G01B 11/2441 |
| NZ | 726586 | A | * | 10/2017 | ........... G01G 19/024 |
| RU | 2716167 | C2 | * | 3/2020 | ............. G02B 26/06 |
| WO | WO-2009007447 | A2 | * | 1/2009 | ............. G02B 26/06 |

OTHER PUBLICATIONS

CN 203337859 U (English Translation) (Year: 2013).*
RU 2716167 C2 (English Translation) (Year: 2020).*
CN 101706597 A (English Translation) (Year: 2010).*
CN 106383397 A (English Translation) (Year: 2017).*
CN 106419869 A (English Translation) (Year: 2017).*
CN 109477968 A (English Translation) (Year: 2019).*
CN 110088993 A (English Translation) (Year: 2019).*
CN 209044186 U (English Translation) (Year: 2019).*
CN 210982908 U (English Translation) (Year: 2020).*
DE 102014109681 A1 (English Translation) (Year: 2016).*
DE 102018106012 B3 (English Translation) (Year: 2019).*
JP 2011247601 A (English Translation) (Year: 2011).*
JP H0829579 A (English Translation) (Year: 1996).*
CN 110376700 (English Translation) (Year: 2019).*

* cited by examiner

OPTICAL DELAY LINE STRUCTURE

RELATED APPLICATIONS

This application is a non-provisional of, claims the benefit and priority of, provisional Application No. 63/131,828, filed Dec. 30, 2020, which is incorporated herein by reference in its entirety.

TECHNICAL FIELD

The present invention relates to an optical delay line structure. More particularly, the invention relates to optical delay line structure that is capable of adjusting the angle of the reflection mirror in optical delay line structure axially.

BACKGROUND

To face the advent of a highly information-based society, communication infrastructure is needed to transmit various kinds of information, such as voice, text, data, images, etc. In the past, copper cable networks could not provide such a huge demand for information. Instead, optical communication network was developed to transmit information. In optical communication networks, optical fiber is usually used as the medium for light transmission. The optical fibers have the advantages of low loss and wide bandwidth, which are suitable for information transmission over long distances.

Optical delay line is often used in optical systems when a time delay is required between two or more optical pulses. In a prior art, the reflector (mirror) inside the optical can be moved back and forth via the slides on the sides outside the optical delay line structure. The optical distance is adjusted along with the distance between the optical fiber and the reflector. In addition, the angle of the reflector can be changed to adjust the light intensity when returning to the optical fiber. Part of the light waves will deviate from the original input path and will not return to the fiber again, so as to attenuate the light intensity. Furthermore, in another prior art, a rotating frame is installed on the side of the reflector, so that reflector can be rotated along its axis via the movements of the rotating frame.

With the increase of the global population and the development of technology, the equipment and tools in the field of optical transmission aim at reducing the overall size and convenience. However, in the above mentioned technologies, it is necessary to provide an additional adjustment element outside the optical delay line structure. The adjustment element always occupies the space of other elements, forcing to enlarge the overall size. It is obvious that the above mentioned technologies cannot meet the requirement of miniaturization. Accordingly, a new optical delay line structure is provided.

SUMMARY

To solve the problems in the prior art, an optical delay line structure is provided in the present invention. Via directly designing a structure to adjust the optical path difference and optical path on the optical delay line, instead of installing sliding rails and adjustment racks outside the optical delay line optical retarder, there is no need to consume the external when installing the optical delay line. The overall space occupied is greatly reduced because there is no need to use additional space to set up the adjustment components.

An optical delay line structure is provided in the present invention, using for adjusting light path to an optical fiber. The optical delay line structure comprises an outer housing, an inner housing and a reflection assembly. The outer housing connects to the optical fiber. The inner housing connects to the outer housing, includes a plurality of fixing screw holes. The reflection assembly connects to the inner housing. The reflection assembly comprises a reflection mirror holder, a plurality of fixing screws and a plurality of adjustment screws. The reflection mirror holder has a plurality of mirror holder screw holes. The reflection mirror is configured in the mirror holder. The plurality of fixing screws configured corresponding to the fixing screw holes, and movably penetrated through the fixing screw holes and part of the mirror holder screw holes. The plurality of adjustment screws movably penetrated through a part of the mirror holder screw holes and against the inner housing. When adjusting at least one of the adjustment screws, the adjustment screws drive the mirror holder so that the reflection mirror is axially tilting.

In some embodiments, the outer housing is further comprising an outer housing head and an outer housing body, the outer housing head is connected to the outer housing body, the optical fiber is placed in the outer housing head, and the inner housing is further comprising an inner housing head and an inner housing body, the inner housing head is connected to the inner housing body, the reflection assembly is disposed on the inner housing head.

In some embodiments, the outer housing is further comprising an outer housing thread part, and the inner housing is further comprising an inner housing thread part, the inner housing thread part and the outer housing thread part are disposed correspondingly, and the inner housing moves axially on the outer housing thread part.

In some embodiments, the outer housing thread part is disposed on the inner surface of the outer housing, the inner housing thread part is disposed on the outer surface of the inner housing.

In some embodiments, the outer housing thread part is disposed on the outer housing body, and the inner housing thread part is disposed on the inner housing body.

In some embodiments, further comprising an optical path adjustment assembly, the optical path adjustment assembly includes a bearing, a screw socket and a screw rod and a turning gear. The bearing connects to the outer housing. The screw socket connects to the inner housing. The screw rod dispose through the bearing and the screw socket. The turning gear connects to the screw rod. Wherein, when moving the turning gear, the screw socket is moved on the screw rod, and the inner housing is moved axially along with the screw socket.

In some embodiments, the screw socket includes a screw socket thread, the screw rod includes a screw rod external thread, and the screw socket thread and the screw rod external thread are disposed correspondingly.

In some embodiments, further comprising an accommodating space, the accommodating space is disposed in the center of the turning gear and inside the screw rod, and located between the turning gear and the screw rod.

In some embodiments, a screw rod adjusting member is disposed in the accommodating space, the screw rod adjusting member having a screw rod adjusting member head and a screw rod adjusting member body, the screw rod adjusting member head is disposed inside the turning gear, the screw rod adjusting member body is disposed inside the screw rod.

In some embodiments, the screw rod adjusting member body having a screw rod adjusting thread, the screw rod having a screw rod inner thread, the screw rod adjusting thread and the screw rod inner thread are disposed correspondingly.

In some embodiments, further comprising a linear bearing, the linear bearing is disposed on the outer housing and partially covering the inner housing.

In some embodiments, when the inner housing is moved axially by the screw socket, the inner housing is moved on the linear bearing.

In some embodiments, the linear bearing is disposed on the outer housing body.

In some embodiments, further comprising a parallel light lens, a spring and a focusing lens, the parallel light lens, the spring and the focusing lens is disposed in order along the direction from the optical fiber to the reflection assembly.

In some embodiments, the parallel light lens is located on the outer housing head.

In some embodiments, the focusing lens is located on the inner housing body.

In some embodiments, the spring is located on both of the outer housing body and the inner housing body, and located between the parallel light lens and the focusing lens.

In some embodiments, the inner diameter of the outer housing body is not less than the outer diameter of the inner housing body.

In some embodiments, the inner diameter of the linear bearing is not less than the outer diameter of the inner housing body.

In some embodiments, the adjustment screws and the fixing screws are arranged alternately.

Accordingly, in the optical delay line structure of the present invention, the optical fiber is connected to the outer housing, and the reflection mirror is set in the inner housing. Through the action between the inner housing and the outer housing, the distance between the optical fiber and the reflection mirror can be changed easily, so as to achieve the purpose of adjusting the optical path difference. The matching between the outer housing thread part and the inner housing thread part makes the inner housing move away from or toward the outer housing in a rotating manner. In addition, the way to actuate the inner housing can be achieved by arranging optical path adjustment assembly on the inner housing and the outer housing. When moving the turning gear of the optical path adjustment assembly, the screw socket optical path adjustment assembly is moved on the screw rod optical path adjustment assembly, and the inner housing is moved axially along with the screw socket. Due to the above-mentioned thread design, the adjustment of the optical path difference can be achieved by rotating a specific element, which reduces the effort required for adjustment. In addition, because the adjustment screw set on the reflection mirror holder, when the reflection path of the light wave need to be adjusted, rotating the adjustment screws can easily change the tilting angle of the reflection mirror, which can further affect the light wave path back to the optical fiber. Also, the above-mentioned threaded parts, optical path adjustment components, and adjustment screws are all arranged within the structural range of the optical delay line structure itself, there is no need to occupy space outside the structure, achieving the purpose of reducing the overall occupying space.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION

An Optical delay line structure is discussed herein. In the following description, for purposes of explanation, numerous specific details are set forth in order to provide a thorough understanding of the present invention. It will be evident, however, to one skilled in the art that the present invention may be practiced without these specific details The present disclosure is to be considered as an exemplification of the invention, and is not intended to limit the invention to the specific embodiments illustrated by the figures or description below.

Figure 1:
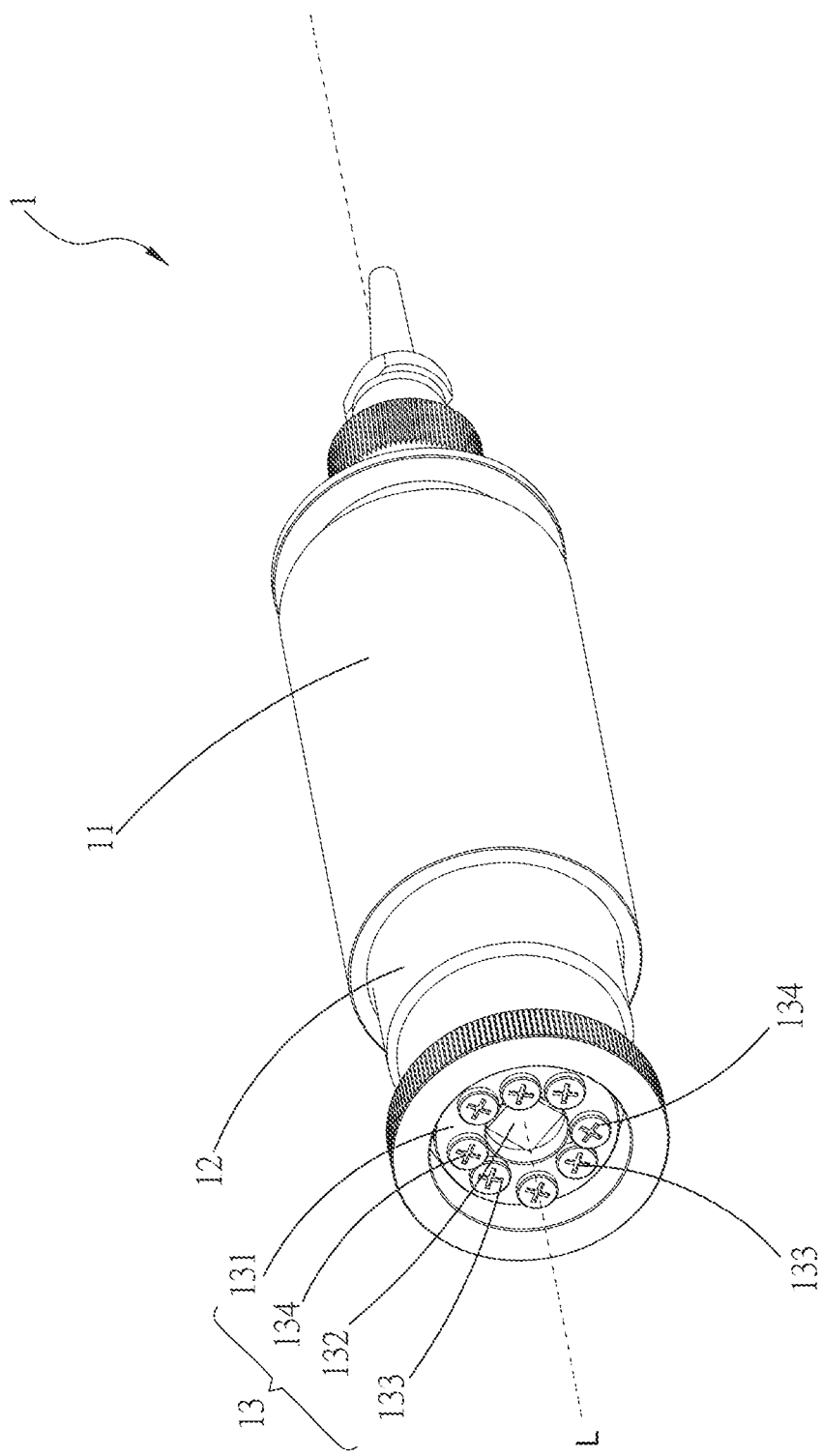
FIG. 1 depicts an optical delay line structure according to various embodiments of this invention.
Figure 2:
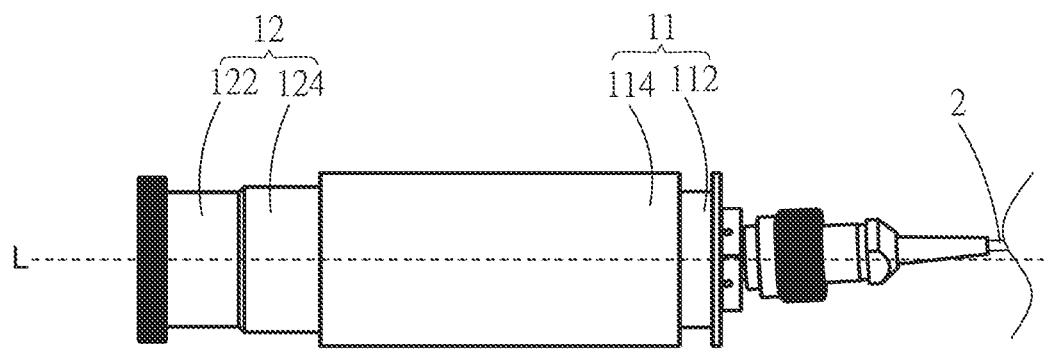
FIG. 2 depicts an optical delay line structure according to various embodiments of this invention.
Figure 3A:
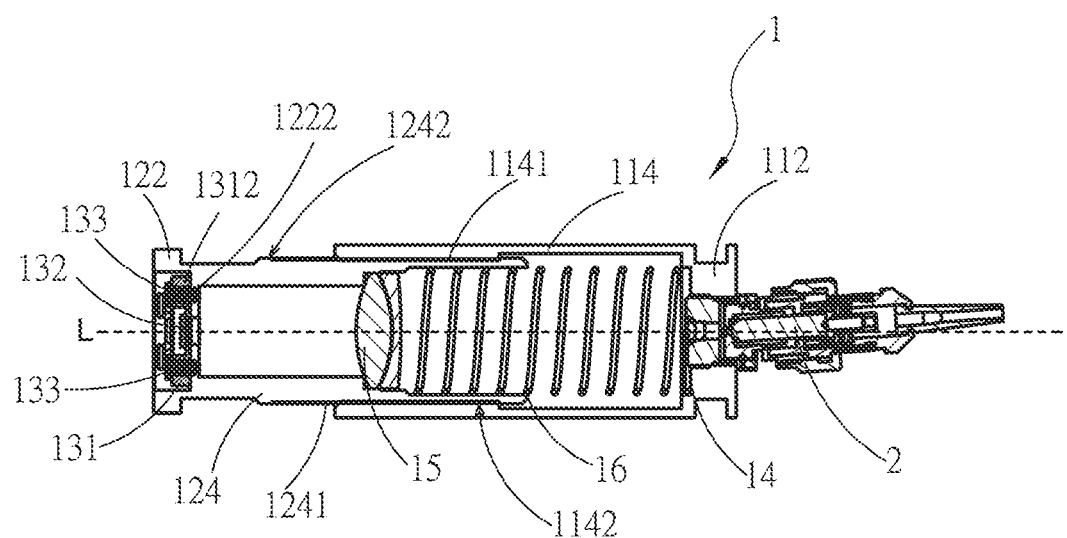
FIG. 3A depicts a cross-sectional view of an optical delay line structure to various embodiments of this invention.
Figure 3B:
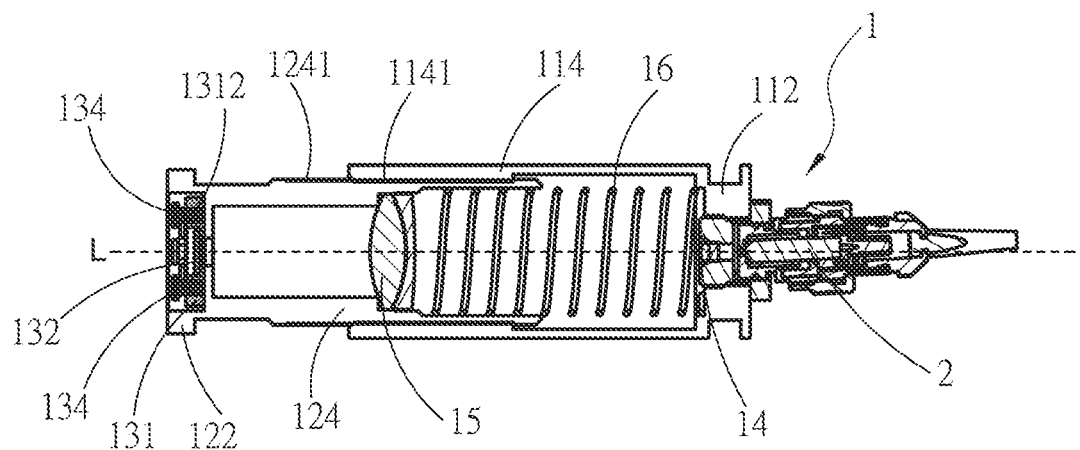
FIG. 3B depicts a cross-sectional view of an optical delay line structure to various embodiments of this invention.

The present invention will now be described by referencing the appended figures representing preferred embodiments. In the present invention, one end of the optical delay line structure is connected to the optical fiber. When the optical signal is transmitted from the optical fiber to the optical delay line structure, the optical signal passes through the reflection mirror in the optical delay line structure to transmit the optical signal to the optical fiber back again. FIG. 1 depicts an optical delay line structure according to various embodiments of this invention. FIG. 2 depicts an optical delay line structure according to various embodiments of this invention. FIG. 3A depicts a cross-sectional view of an optical delay line structure to various embodiments of this invention. FIG. 3B depicts a cross-sectional view of an optical delay line structure to various embodiments of this invention. The optical delay line structure 1 comprises an outer housing 11, an inner housing 12, and a reflection assembly 13. The outer housing 11 is connected with the optical fiber 2. and includes an outer housing thread part 1141. The inner housing 12 is connected to the outer housing 11 and includes an inner housing thread part 1241 and a plurality of fixing screw holes 122. The inner housing thread part 1241 and the outer housing thread part 1141 are disposed correspondingly. The reflection assembly 13 is connected to the inner housing 12 and includes a reflection mirror holder 131, a reflection mirror 132, a plurality of fixing screws 133 and a plurality of adjusting screws 134. The reflection mirror holder 131 has a plurality of mirror holder screw holes 1312, the reflection mirror 132 is configured in the mirror holder 121, the fixing screws 133 are configured corresponding to the mirror holder screw holes 1312, and are movably penetrated through the fixing screw holes 122 and part of the mirror holder screw holes 1312. The adjustment screws 134 and the fixing screws 133 are arranged alternately.

The outer housing 11 includes an outer housing head 112 and an outer housing body 114. The outer housing head 112 is connected to the outer housing body 114. The optical fiber 2 is placed in the outer housing head 112. The outer housing thread part 1141 is located on the outer housing body 114. The inner housing 12 includes an inner housing head 122 and an inner housing body 124. The inner housing head 122 is connected to the inner housing body 124. The reflection assembly 13 and the fixing screw holes 1222 are located on the inner housing head 122. The outer housing thread part 1141 is located on the inner surface 1142 of the outer housing body 114. The inner housing thread part 1241 is located on the outer surface 1242 of the inner housing body 124. In this embodiment, the inner diameter of the outer housing body 114 is not less than the outer diameter of the inner housing body 124. However, the present invention does not limit the surfaces where the outer housing thread part or the inner housing thread part are located, the thread part between the outer housing and the inner housing is used for achieving the movement between the outer housing and the inner housing so as to change the distance between the reflection assembly and the optical fiber.

In addition, the optical delay line structure 1 further comprises a parallel light lens 14, a focusing lens 15 and a spring 16. The parallel light lens 14 is disposed in the outer housing head 112. The focusing lens 15 is disposed in the inner housing body 124. The spring 16 is disposed in the outer housing body 114 and the inner housing body 124, and located between the parallel light lens 14 and the focusing lens 15. The parallel light lens 14, the spring 16 and the focusing lens 15 is disposed in order along the direction L from the optical fiber 2 to the reflection assembly 13.

Please referring to FIG. 1, FIG. 3A and FIG. 3B again to further understand the arrangement of the fixing screws 133 and the adjustment screws 134 of the reflection assembly 13. In this embodiment, the inner housing head 122 of the inner housing 12 has the fixing screw holes 1222, the mirror holder 131 has the mirror holder screw holes 1312. The fixing screws 133 are penetrated through the fixing screw holes 1222 and part of the mirror holder screw holes 1312 as shown in FIG. 3A. The adjustment screws 134 are penetrated through part of the mirror holder screw holes 1312 as shown in FIG. 3B. The adjustment screws 134 and the fixing screws 133 are arranged alternately. In this embodiment, the number of the adjustment screws 134 and the fixing screws 133 are the same. However, the number of the adjustment screws 134 and the fixing screws 133 can be different. That is, the number of the adjustment screws 134 and the fixing screws 133 are not limited as long as the number is sufficient to adjust the tilting angle of the reflection mirror.

Figure 4A:
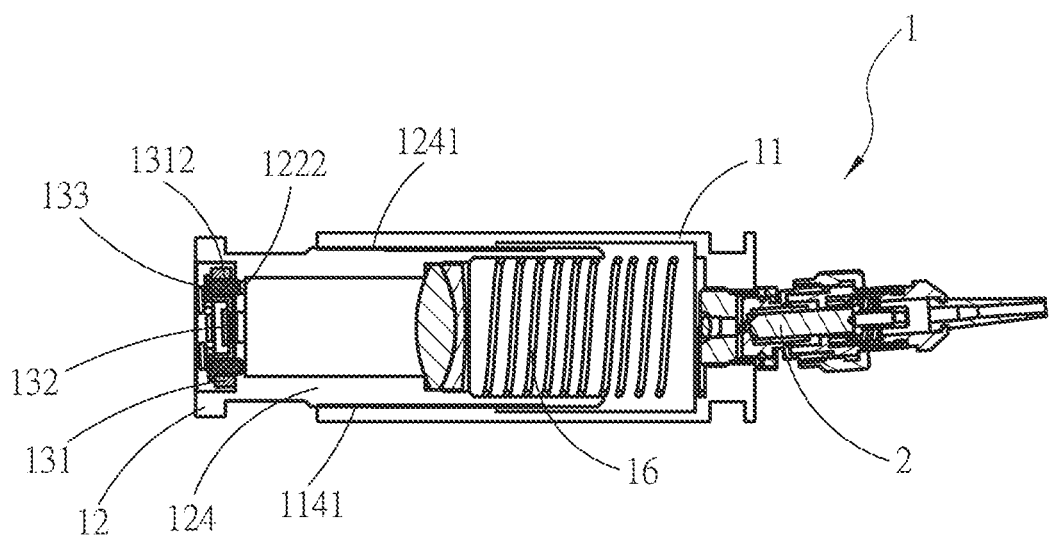
FIG. 4A depicts a cross-sectional view of an optical delay line structure to various embodiments of this invention.
Figure 4B:
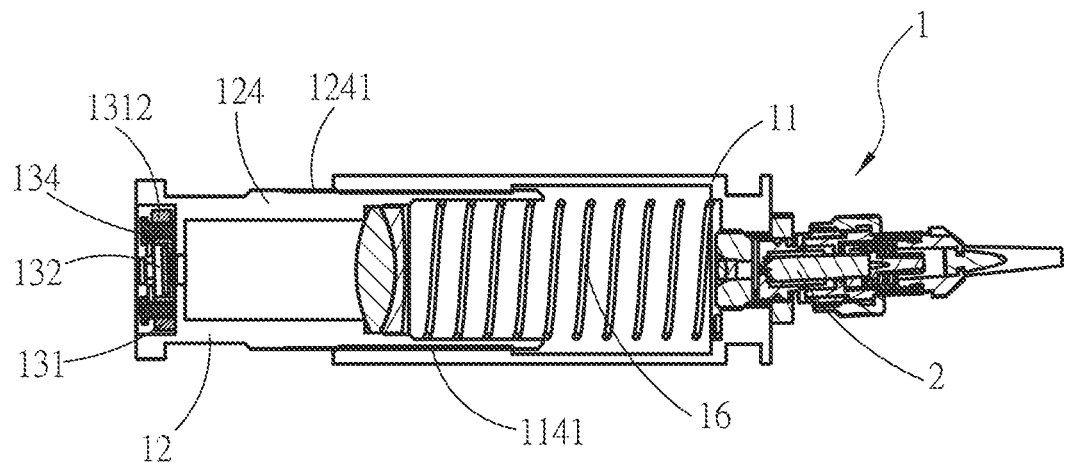
FIG. 4B depicts a cross-sectional view of an optical delay line structure to various embodiments of this invention.

The process and structure of adjusting the optical path of the optical delay line structure will be explained herein. Please referring to FIG. 1, FIG. 3A and FIG. 3B again, and also referring to FIG. 4A and FIG. 4B. FIG. 4A depicts a cross-sectional view of an optical delay line structure to various embodiments of this invention. FIG. 4B depicts a cross-sectional view of an optical delay line structure to various embodiments of this invention. First, before doing any adjustment to the reflection mirror 132, as shown in FIG. 3A and FIG. 3B, the fixing screws 133 are locked in the fixing screw hole 1222 of the inner housing head 122 and part of the mirror holder screw hole 1312. The adjusting screw 134 penetrated through a part of the mirror holder screw holes 1312 and against the inner housing head 122. When it comes to adjusting the tilting angle of the reflection mirror 132, as shown in FIG. 4A, loosing part of the fixing screws 133 to make the fixing screws away from the inner housing body 124, then, as shown in FIG. 4B, locking the adjusting screw 134, the mirror holder 131 will be driven to away from the inner housing body 124. So that, the reflection mirror 132 on the mirror holder 131 is axially tilting at the same time. The intensity of the returned optical signal is also adjusted. In this embodiment, when one of the adjustment screws is adjusted, the fixing screws on both sides of the adjustment screw are loosened, and then the adjustment screw is tightened. However, the number of tightening and loosening fixing screws and adjustment screws are not limited as long as the number can achieve the purpose of adjusting the tilting angle of the reflection mirror.

In addition to changing the tilting angle of the reflection mirror, this embodiment further explains how to adjust the optical path by changing the distance between the optical fiber and the reflection mirror. Please referring to FIG. 4A and FIG. 4B. As shown in FIG. 4A, the inner housing thread part 1241 is totally located in the outer housing 11, at the same time, the spring 16 is pushed into a compressed state. Now as shown in FIG. 4B, the inner housing 12 is rotated to make part of the inner housing thread part 1241 not coincide with the outer housing thread part 1141, at the same time, the spring 16 is pushed less than in FIG. 4A. Via the cooperation of the outer housing thread part 1141 and the inner housing thread part 1241, and the spring 16 the spring 16 reduces the generation of thread backlash between the outer housing thread part 1141 and the inner housing thread part 1241. In this way, the inner housing 12 can easily move axially between the outer housing thread part 1141 of the outer housing to change the distance between the reflection mirror 132 and the optical fiber 2 with stability and accuracy.

Figure 5:
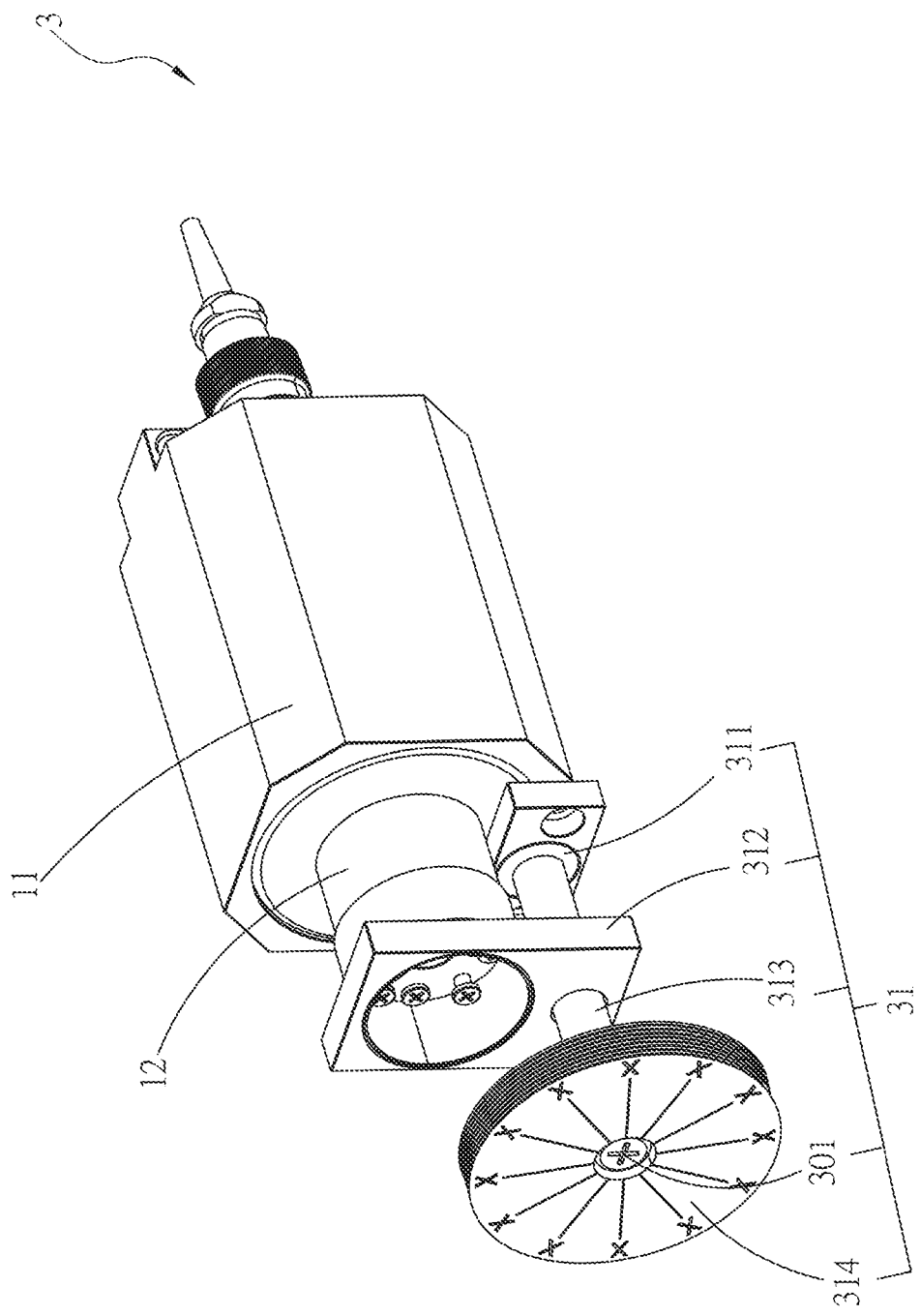
FIG. 5 depicts an optical delay line structure according to various embodiments of this invention.
Figure 6:
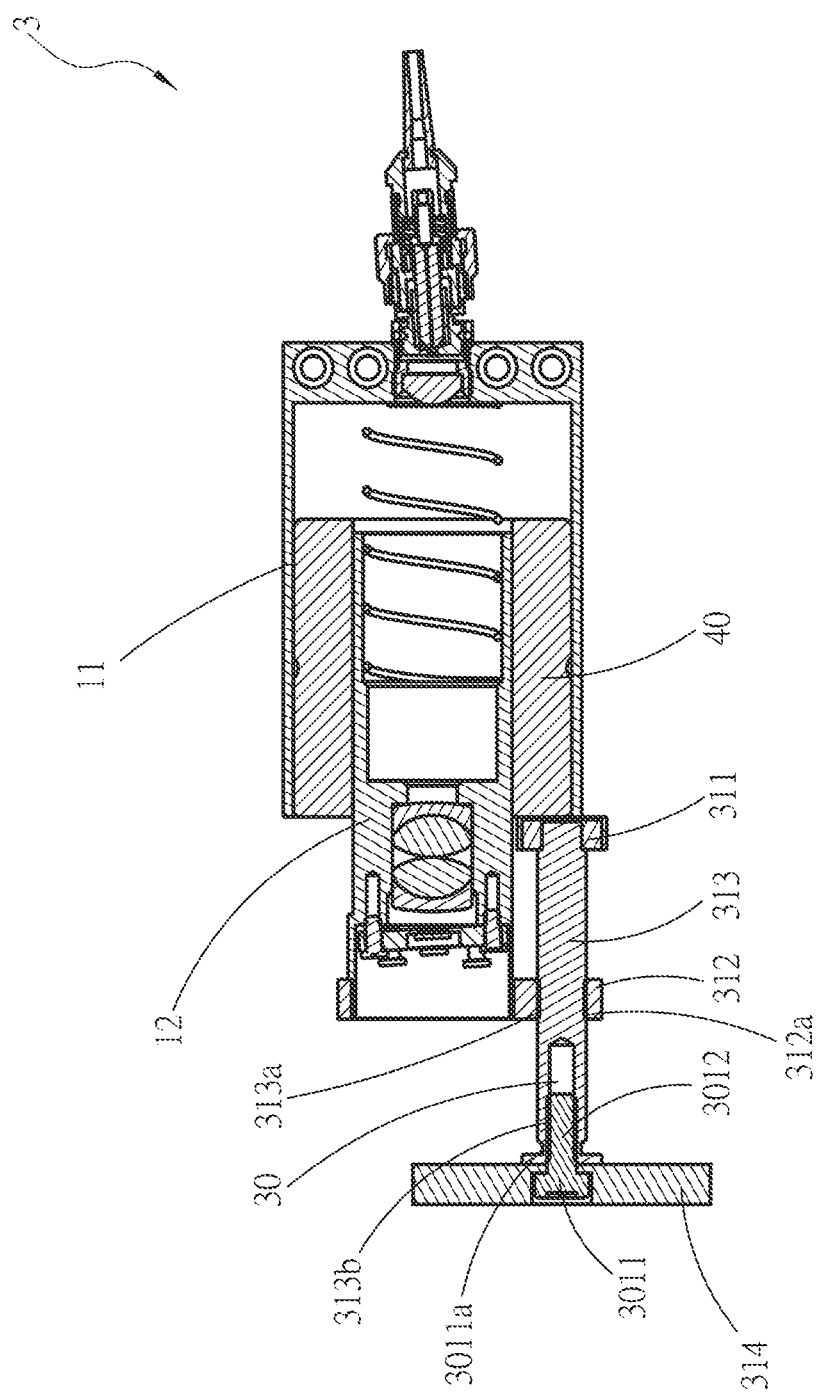
FIG. 6 depicts an optical delay line structure according to various embodiments of this invention.

Besides of setting thread parts on the outer housing and the inner housing as described in the above embodiment, the present invention also provides another way for adjusting the optical path difference. Please referring to FIG. 5 and FIG. 6. FIG. 5 depicts an optical delay line structure according to various embodiments of this invention. FIG. 6 depicts an optical delay line structure according to various embodiments of this invention. The difference from the embodiment of FIG. 1 to FIG. 4B is that this embodiment is to adjust the optical path difference by arranging an optical path adjustment assembly. The differences between this embodiment and the foregoing embodiment will be described in more detail below, and the same points will not be repeated here. The optical delay line structure 3 comprises an outer housing 11, an inner housing 12 and a reflection assembly, an optical path adjustment assembly 31. The optical path adjustment assembly 31 comprises a bearing 311, a screw socket 312 and a screw rod 313, a turning gear 314. The bearing 311 connects to the outer housing 11. The screw socket 312 connects to the inner housing 12. The screw rod 313 dispose through the bearing 311 and the screw socket 312. The turning gear 313 connects to the screw rod 313.

The screw socket 312 includes a screw socket thread 312a, the screw rod 313 includes a screw rod external thread 313a, and the screw socket thread 312a and the screw rod external thread 313a are disposed correspondingly. In addition, this embodiment further comprises an accommodating space 30. The accommodating space 30 is disposed in the center of the turning gear 314 and inside the screw rod 313, and located between the turning gear 314 and the screw rod 313. Wherein, a screw rod adjusting member 301 is disposed in the accommodating space 30. The screw rod adjusting member 301 has a screw rod adjusting member head 3011 and a screw rod adjusting member body 3012, the screw rod adjusting member head 3011 is disposed inside the turning gear 314, the screw rod adjusting member body 3012 is disposed inside the screw rod 313. The screw rod adjusting member body 3012 has a screw rod adjusting thread 3011a, the screw rod 313 having a screw rod inner thread 313b, the screw rod adjusting thread 3011a and the screw rod inner thread 313b are disposed correspondingly. A linear bearing 40 is disposed on the outer housing 11 and covering at least part of the inner housing 12.

More particularly, when operating the turning gear 314, for example, rotating the turning gear 314, the turning gear 314 actuates the screw rod adjusting member 301 located therein. Due to the matching arrangement between screw rod adjusting thread 3011a and the screw rod inner thread 313b, the screw rod 313 is moved relative to the turning gear 314. At the same time, due to the coordinated arrangement between the screw socket thread 312a and the screw rod external thread 313a, the screw socket thread 312a can move on the screw rod 313, and the inner housing 12 is driven by the screw socket 312 so that the inner housing 12 can move axially. And in this embodiment, the inner housing 12 is driven by the screw socket 312 and move axially on the bearing 311 relative to the outer housing 11.

With the arrangement of the optical path adjustment assembly described above, and with the assistance of linear bearings, the inner housing can be moved steadily to approach or stay away from the outer housing. The inner housing will not rotate while moving, so that the tilting angle of the reflection mirror will be changed during the period of adjusting the optical path. In addition, the optical path adjustment assembly and the linear bearing are directly arranged in the range of the optical delay line structure, and will not affect component configuration outside the structure.

That is, the present invention provides an optical delay line structure that is suitable for adjusting the light path transmitted to an optical fiber. The present invention provides two ways to adjust the optical path difference. The first is through the cooperation of the threaded part of the outer housing and the inner housing, so that the inner housing can be moved on the threaded part, and the distance between the two can be changed freely. The second way is to adjust the optical path difference with the optical path adjustment assembly. However, no matter the first or the second way of adjusting the optical path difference, it is necessary to adjust the tilting angle of the reflection mirror with the tightening of the adjustment screw and the fixing screw, so as to change the light wave path and light wave intensity back to the optical fiber.

Accordingly, the present invention at least includes the advantages below.

First, instead of using complicated component, the present invention uses the tighten and loosen of screws to change the angle adjusting of reflection mirror. It is not only easy to operate but also not costly.

And, both of the ways described in the present invention to adjust the light path differences are arranged in the structure of optical delay line. No extra space will be occupied outside the optical delay line structure.

Finally, the present invention does not use the slides in the prior arts, not only reduce the tolerance problems that may occur during installation, also save the time required to install the extra elements.

The present invention uses the inner and outer housing to adjust the optical path difference. The inner housing can move axially on the outer housing body of the outer housing, so that the reflection mirror on the inner housing can move along with the inner housing and change the distance between the reflection mirror and the optical fiber. In addition, rotating the adjusting and fixing screws will change the tilting angle of the reflection mirror. It means that the reflecting angle is depending on the movement and the position of the adjusting screws and the fixing screws. The present invention achieved the purpose of miniaturization, provides extra space for arranging other elements of the optical system.

The optical delay line structure of the present invention can be applied to various field of inspection or detection, such as industrial inspection and skin detection. Take industrial inspection for an example, the optical delay line structure can be used as a part of an interference module. However, the above-mentioned description is considered as an example of the invention, and is not intended to limit the invention to the specific application.

The presently disclosed inventive concepts are not intended to be limited to the embodiments shown herein, but are to be accorded their full scope consistent with the principles underlying the disclosed concepts herein. Directions and references to an element, such as "up," "down,", "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112(f) unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. An optical delay line structure, for adjusting light path to an optical fiber, the optical delay line structure comprising:

an outer housing, connected to the optical fiber;
an inner housing, connected to the outer housing, including a plurality of fixing screw holes; and
a reflection assembly, connected to the inner housing, and comprising:
  a reflection mirror holder, having a plurality of mirror holder screw holes;
  a reflection mirror, configured in the mirror holder;
  a plurality of fixing screws, respectively corresponding to the plurality of fixing screw holes, and movably penetrated through the fixing screw holes and part of the mirror holder screw holes; and
  a plurality of adjustment screws, movably penetrated through a part of the mirror holder screw holes and against the inner housing, when adjusting at least one of the adjustment screws, the adjustment screws drive the mirror holder so that the reflection mirror is axially tilting;
wherein the optical delay line structure further comprises an optical path adjustment assembly and an accommodating space, and the optical path adjustment assembly comprises a screw rod and a turning gear, a screw rod adjusting member is disposed in the accommodating space, wherein the screw rod adjusting member has a screw rod adjusting member head and a screw rod adjusting member body, the screw rod adjusting member head is disposed inside the turning gear, the screw rod adjusting member body is disposed inside the screw rod.

2. The optical delay line structure of claim 1, wherein the outer housing is further comprising an outer housing head and an outer housing body, the outer housing head is connected to the outer housing body, the optical fiber is placed in the outer housing head, and the inner housing is further comprising an inner housing head and an inner housing body, the inner housing head is connected to the inner housing body, the reflection assembly is disposed on the inner housing head.

3. The optical delay line structure of claim 1, wherein the outer housing is further comprising an outer housing thread part, and the inner housing is further comprising an inner housing thread part, the inner housing thread part and the outer housing thread part are disposed correspondingly, and the inner housing moves axially on the outer housing thread part.

4. The optical delay line structure of claim 3, wherein the outer housing thread part is disposed on the inner surface of the outer housing, the inner housing thread part is disposed on the outer surface of the inner housing.

5. The optical delay line structure of claim 3, wherein the outer housing thread part is disposed on the outer housing body, and the inner housing thread part is disposed on the inner housing body.

6. The optical delay line structure of claim 1, wherein the optical path adjustment assembly further includes:
  a bearing, connected to the outer housing;
  a screw socket, connected to the inner housing;
  the screw rod, disposed through the bearing and the screw socket; and
  the turning gear, connected to the screw rod;
  wherein, when moving the turning gear, the screw socket is moved on the screw rod, and the inner housing is moved axially along with the screw socket.

7. The optical delay line structure of claim 6, wherein the screw socket includes a screw socket thread, the screw rod includes a screw rod external thread, and the screw socket thread and the screw rod external thread are disposed correspondingly.

8. The optical delay line structure of claim 6, wherein the accommodating space is disposed in the center of the turning gear and inside the screw rod, and located between the turning gear and the screw rod.

9. The optical delay line structure of claim 6, wherein the screw rod adjusting member body has a screw rod adjusting thread, the screw rod has a screw rod inner thread, the screw rod adjusting thread and the screw rod inner thread are disposed correspondingly.

10. The optical delay line structure of claim 1, further comprising a linear bearing, the linear bearing is disposed on the outer housing and partially covering the inner housing.

11. The optical delay line structure of claim 10, wherein when the inner housing is moved axially by the screw socket, the inner housing is moved on the linear bearing.

12. The optical delay line structure of claim 10, wherein the linear bearing is disposed on the outer housing body.

13. The optical delay line structure of claim 1, further comprising a parallel light lens, a spring and a focusing lens, the parallel light lens, the spring and the focusing lens is disposed in order along the direction from the optical fiber to the reflection assembly.

14. The optical delay line structure of claim 13, wherein the parallel light lens is located on the outer housing head.

15. The optical delay line structure of claim 13, wherein the focusing lens is located on the inner housing body.

16. The optical delay line structure of claim 13, wherein the spring is located on both of the outer housing body and the inner housing body, and located between the parallel light lens and the focusing lens.

17. The optical delay line structure of claim 2, wherein the inner diameter of the outer housing body is not less than the outer diameter of the inner housing body.

18. The optical delay line structure of claim 10, wherein the inner diameter of the linear bearing is not less than the outer diameter of the inner housing body.

19. The optical delay line structure of claim 1, wherein the adjustment screws and the fixing screws are arranged alternately.

* * * * *